(12) United States Patent
Taniguchi et al.

(10) Patent No.: US 8,644,495 B2
(45) Date of Patent: Feb. 4, 2014

(54) ECHO CANCELER

(75) Inventors: Takuya Taniguchi, Tokyo (JP); Shin Kato, Tokyo (JP); Noritaka Kokido, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 223 days.

(21) Appl. No.: 13/341,034

(22) Filed: Dec. 30, 2011

(65) Prior Publication Data
US 2012/0099723 A1 Apr. 26, 2012

Related U.S. Application Data

(62) Division of application No. 12/991,607, filed as application No. PCT/JP2009/001668 on Apr. 10, 2009, now Pat. No. 8,130,941.

(30) Foreign Application Priority Data
Jun. 11, 2008 (JP) ................. 2008-153071

(51) Int. Cl.
*H04M 9/08* (2006.01)
*H04B 3/20* (2006.01)

(52) U.S. Cl.
USPC ..................... 379/406.08; 381/66

(58) Field of Classification Search
None
See application file for complete search history.

(56) References Cited

U.S. PATENT DOCUMENTS

| 6,553,121 | B1* | 4/2003 | Matsuo et al. ............ 381/17 |
| 6,665,645 | B1 | 12/2003 | Ibaraki et al. |
| 6,697,486 | B1 | 2/2004 | Takada |
| 2009/0169027 | A1* | 7/2009 | Ura et al. ............ 381/66 |

FOREIGN PATENT DOCUMENTS

| JP | 4-119713 A | 4/1992 |
| JP | 9-130306 A | 5/1997 |
| JP | 2000-231399 A | 8/2000 |
| JP | 2001-77728 A | 3/2001 |
| JP | 2001-100785 A | 4/2001 |
| JP | 2002-237770 A | 8/2002 |
| JP | 2003-99100 A | 4/2003 |
| JP | 2006-148375 A | 6/2006 |
| JP | 2006-314051 A | 11/2006 |
| JP | 2007-515911 A | 6/2007 |
| WO | WO 2005/062595 A1 | 7/2005 |

* cited by examiner

*Primary Examiner* — Simon Sing
*Assistant Examiner* — Jeffrey Lytle
(74) *Attorney, Agent, or Firm* — Birch, Stewart, Kolasch & Birch, LLP (57) ABSTRACT

An echo canceler 10 generates an echo elimination signal by filtering through adaptive filters 101 and 102 reference signals input from sound sources causing echoes. It includes a sound source number detecting unit 103 for detecting the number of the sound sources causing echoes from the reference signals, and a control unit 105 for making the number of taps of the adaptive filters 101 and 102 variable in accordance with the number of the sound sources detected by the sound source number detecting unit 103.

4 Claims, 5 Drawing Sheets

ECHO CANCELER

CROSS REFERENCE TO RELATED APPLICATIONS

This application is a Divisional of application Ser. No. 12/991,607 filed on Nov. 8, 2010 now U.S. Pat. No. 8,130,941, which is a National Phase of PCT International Application No. PCT/JP2009/001668 filed on Apr. 10, 2009, which claims the benefit of Japanese Application No. 2008-153071 filed in Japan, on Jun. 11, 2008. The entire contents of all of the above applications are hereby incorporated by reference.

TECHNICAL FIELD

The present invention relates to an echo canceler suitable for an onboard voice recognition system and a hands-free phone in particular.

BACKGROUND ART

Conventionally, concerning the voice recognition in an onboard navigation system or in a hands-free phone, an echo canceler has been known which can recognize or transmit to a party via a phone only voices of a talker by eliminating, from voices input to a microphone, music and voices output from an onboard speaker or speakers (see Patent Documents 1 and 2, for example).

As disclosed in the foregoing Patent Documents 1 and 2, an echo canceler of a type that generates an elimination signal of echoes mixed into a microphone from echo sound sources via speakers by processing reference signals input from the echo sound sources with adaptive filters must perform echo cancellation processing for each of the sound sources causing echoes (referred to as an "echo sound source" from now on).

For this reason, considering the maximum number of echo sound sources supposed, such as 6 channels-8 channels, a processor with high processing capacity must be mounted. Furthermore, in a condition having only the number of echo sound sources less than the maximum number of echo sound sources supposed, since it becomes unnecessary to carry out some of the processing of the adaptive filters, the echo cancellation processing lead to waste, and wasteful allocation of processor resources occurs.

In addition, in the adaptive filters, the number of taps required varies depending on environments in which the voice recognition system or hands-free phone is used, and when determining the number of taps on the assumption of the worst environment, a processor with very high processing capacity is required because the echo cancellation effect increases with an increase of the number of taps.

For this reason, in a voice recognition system for AV equipment, a technique has been known conventionally which reduces the processing amount of a processor by always making the reference signals of the echo sound sources monaural (see Patent Document 3, for example). Since the technique can always reduce the number of the echo sound sources to one, it can prevent the echo cancellation processing from causing waste by the reduction of the number of the echo sound sources.

RELEVANT DOCUMENTS

Patent Documents

Patent Document 1: Japanese Patent Laid-Open No. 2000-231399;

Patent Document 2: Japanese Patent Laid-Open No. 2003-99100; and

Patent Document 3: Japanese Patent Laid-Open No. 2001-100785.

However, according to the technique disclosed in Patent Document 3, it makes only the reference signals monaural. Thus, when using the sound sources causing echoes in stereo, it is likely that the amount of echo cancellation by the adaptive filters can deteriorate, and its possibility increases with an increase of the number of the echo sound sources (channels).

Incidentally, making monaural both the reference signals and sound sources causing echoes enables the echo cancellation processing without deteriorating the amount of echo cancellation. However, when selecting an audio sound source such as a CD (Compact Disc), DVD (Digital Versatile Disc) or TV (Television) as the echo sound source, making it monaural has a problem of always impairing a sense of realism of the stereo or surround sound greatly, thereby presenting a fatal flaw as the AV equipment.

Alternatively, a method that makes monaural only during talking can be conceived. However, since it is necessary for the adaptive filters to learn filter coefficients because of their properties, a problem arises of taking a lot of time for the adaptive filters to learn before they become able to handle talking.

The present invention is implemented to solve the foregoing problems. Therefore it is an object of the present invention to provide an echo canceler capable of achieving a greater echo cancellation effect independently of the number of the echo sound sources.

DISCLOSURE OF THE INVENTION

To solve the foregoing problems, an echo canceler in accordance with the present invention is an echo canceler for generating an echo elimination signal by filtering, through adaptive filters, reference signals input from sound sources causing echoes, the echo canceler including: a sound source number detecting unit for detecting the number of the sound sources causing echoes from the reference signals; and a control unit for making the number of taps of the adaptive filters variable in accordance with the number of the sound sources detected by the sound source number detecting unit.

In addition, an echo canceler in accordance with the present invention is an echo canceler having a processor for executing echo cancellation processing by generating an echo elimination signal by filtering, through one or more adaptive filters, reference signals input from sound sources causing echoes, the echo canceler including: a signal power measuring unit for monitoring signal powers before and after the echo cancellation processing of the adaptive filters by the processor; and a control unit for making the effective number of the adaptive filters or the number of taps of them variable in accordance with trade-off between processing capacity of the processor and echo cancellation effect through the one or more adaptive filters, which are decided from outputs of the signal power measuring unit.

Furthermore, an echo canceler in accordance with the present invention is an echo canceler having a processor for generating an echo elimination signal by filtering, through one or more adaptive filters, reference signals input from sound sources causing echoes, the echo canceler including: a sound source number conversion unit for making the number of the echo sound sources variable in accordance with a prescribed condition; and a control unit for monitoring signal powers before and after echo cancellation processing of the adaptive filters, and for reducing an effective number of the echo sound sources by controlling the sound source number conversion unit when making a decision that processing capacity of the processor is not enough to process the adaptive filters the number of which equals the number of the sound sources causing echoes.

According to the echo canceler in accordance with the present invention, it can achieve a greater echo cancellation effect independently of the number of the echo sound sources.

BEST MODE FOR CARRYING OUT THE INVENTION

The best mode for carrying out the invention will now be described with reference to the accompanying drawings to explain the present invention in more detail.

Embodiment 1

Figure 1:
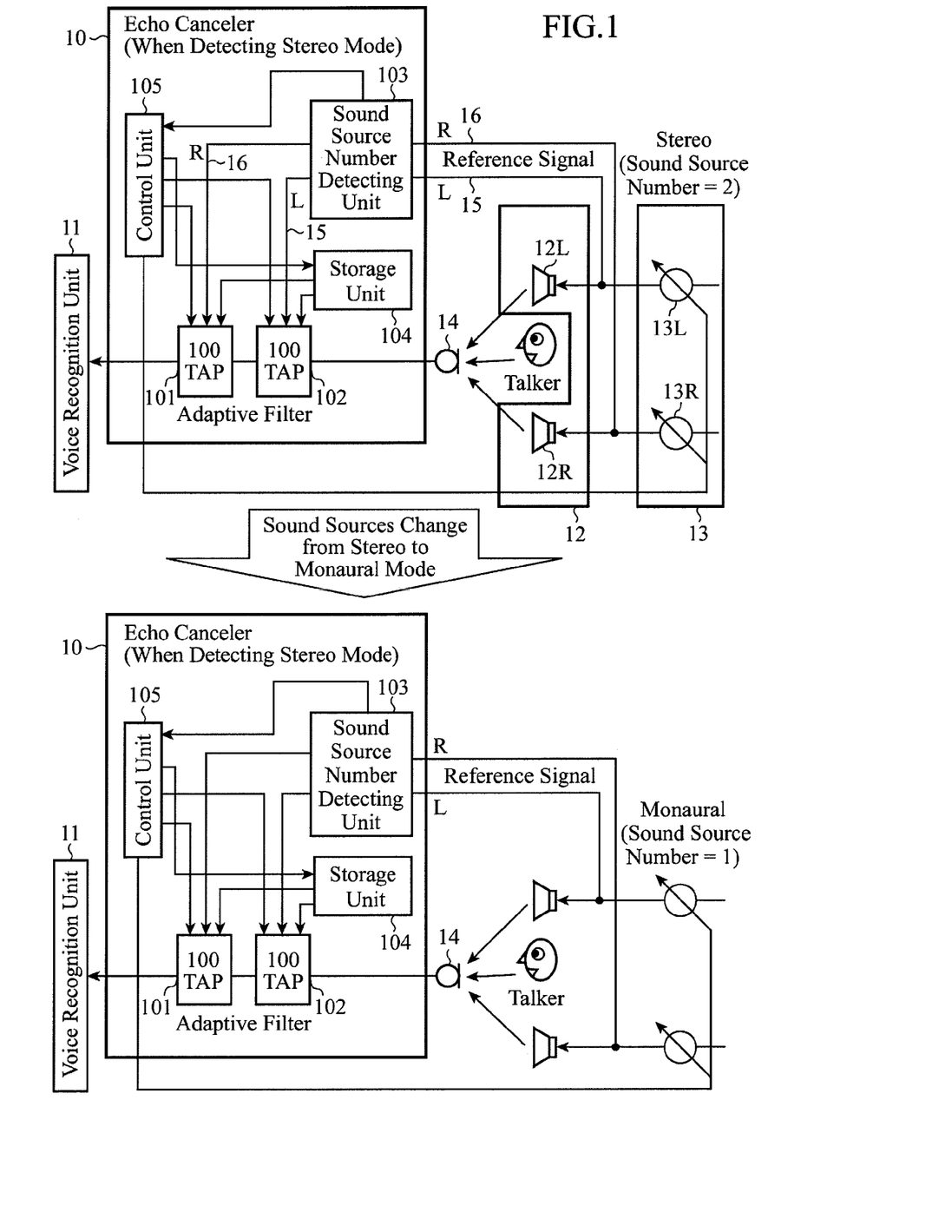
FIG. 1 is a block diagram showing a configuration of a voice recognition system including an echo canceler of an embodiment 1 in accordance with the present invention, and showing changes in the echo canceler when a sound source changes from a stereo to monaural mode.

FIG. 1 is a block diagram showing a configuration of a voice recognition system including an echo canceler of an embodiment 1 in accordance with the present invention, and showing changes in the echo canceler when a sound source changes from a stereo to monaural mode.

As shown in FIG. 1, the voice recognition system comprises an echo canceler 10, a voice recognition unit 11, speakers 12 (12L and 12R), a volume control unit 13 (13L and 13R), and a microphone 14.

The echo canceler 10 has adaptive filters 101 and 102, a sound source number detecting unit 103, a storage unit 104, and a control unit 105.

The adaptive filters 101 and 102 are filters that make their transfer functions self-adaptive in accordance with the optimization algorithm such as the LMS (Least Mean Square). More specifically, they are mounted in the form of a DSP operating as a digital filter for carrying out digital signal processing.

The sound source number detecting unit 103 detects the number of sound sources causing echoes, and transfers to the control unit 105. Here, it detects a stereo-to-monaural change and notifies the control unit 105 of the change. The storage unit 104 stores filter coefficients (learned data) corresponding to the number of taps of the adaptive filters 101 and 102 under the control of the control unit 105.

According to the number of sound sources causing echoes, which is detected by the sound source number detecting unit 103, the control unit 105 carries out variable control of the number of taps of the adaptive filters 101 and 102. In addition, when changing the number of taps of the adaptive filters 101 and 102, the control unit 105 saves the filter coefficients of the adaptive filters 101 and 102 immediately before the change in the storage unit 104, and reuses the filter coefficients by restoring them from the storage unit 104 when performing processing by using the same number of taps next time.

The voice recognition unit 11 acquires the output of the echo canceler 10 as its input signal, and carries out voice recognition of the contents of utterance of a talker (designated by a face mark in FIG. 1) collected by the microphone 14.

The voice recognition unit 11 employs a basic mechanism of the voice recognition that converts input voices to a feature quantity using a mathematical signal processing technique such as Fourier analysis; that refers to an acoustic model showing correspondence between sounds of the feature quantity obtained here and the probability of phonetic symbols, a dictionary consisting of a database of words to be recognized and a language model showing the utterance probability of the words in the dictionary for each application; and that outputs a text based on a technique of probability and statistics.

In the foregoing configuration, the echo canceler 10 captures playback sounds by an onboard AV device, for example, which are output from the speakers 12L and 12R, via the communication lines 15 and 16 as reference signals. Then, the echo canceler 10 eliminates the output sounds of the speakers 12L and 12R, which are mixed into the speech the talker produces via the microphone 14, with the adaptive filters 101 and 102, and delivers its output to the voice recognition unit 11.

Here, the echo canceler 10 has the sound source number detecting unit 103, and while the sound source number detecting unit 103 detects a stereo mode, the control unit 105 causes the adaptive filters 101 and 102 to operate at the number of taps "100". When it detects a monaural mode, the control unit 105 controls in such a manner that one of the adaptive filters (adaptive filter 102, here) increases the number of taps (+100), and that the other adaptive filter (adaptive filter 101) stops the echo cancellation processing.

Thus, the control unit 105 alters the number of taps of the adaptive filters 101 and 102 dynamically in accordance with the dynamic changes in the number of the sound sources, thereby always achieving the echo cancellation processing with the appropriate number of filter taps even for a sound source such as radio broadcasting that switches between the stereo and monaural modes. In addition, it alters the number of taps of the adaptive filters 101 and 102 immediately in accordance with the changes in the number of the sound sources, thereby being able to prepare for setting the appropriate amount of echo cancellation without delay even if the number of the sound sources increases.

The output of the echo canceler 10, which is controlled and generated as described above, is transferred to the voice recognition unit 11 which performs voice recognition of the contents of utterance of the talker collected by the microphone 14. The voice recognition unit 11 extracts feature quantity from the contents of utterance, outputs text recognized by referring to the acoustic model, dictionary and language model not shown and delivers the text to the navigation system, thereby enabling navigation such as destination setting, guidance and the like by speech input.

Incidentally, the control unit 105 carries out its control in such a manner as to maintain the number of taps of the adaptive filters 101 and 102 during and immediately before the voice recognition by the voice recognition unit 11. This is a measure taken to circumvent erroneous recognition of the voice because of the corruption of the filter coefficients of the adaptive filters 101 and 102 during the voice recognition.

In addition, before the control of increasing the number of taps, the control unit 105 saves the filter coefficients immediately before in the storage unit 104, and when the sound source number detecting unit 103 detects the stereo mode next, it restores the filter coefficients saved immediately before and uses them. This makes it possible to reduce learning time period of the adaptive filters 101 and 102, and to contribute to reduction in the amount of operation required for learning. Thus, according to the echo canceler of the embodiment 1 in accordance with the present invention, it can achieve the echo cancellation effect immediately in an adaptive processing time period with the minimum filter coefficients even in a usage environment in which the number of taps of the adaptive filters 101 and 102 varies frequently.

Incidentally, when the adaptive filters 101 and 102 cannot sufficiently eliminate the playback sounds from the speakers 12 (12L, 12R), the control unit 105 can limit the volume of the speakers 12 (12L, 12R) at any desired level by controlling the volume control unit 13 (13L, 13R). This can prevent the AV playback sounds and the like output from the speakers 12 (12L, 12R) from mixing into the input speech.

According to the foregoing echo canceler of the embodiment 1 in accordance with the present invention, it alters the number of taps of the adaptive filters 101 and 102 in accordance with the changes in the number of sound sources causing echoes, thereby being able to further improve the echo cancellation processing capacity when the number of the echo sound sources is small by utilizing surplus processing capacity of the echo canceler 10 that includes the DSP.

Incidentally, as for the number of taps set to the adaptive filter 102 in this case, making it a number inversely proportional to the number of sound sources causing echoes enables flexible control that meets the DSP performance, because it is changed in accordance with the number of the sound sources.

In addition, by limiting the maximum volume of the sound sources causing the echoes (speakers 12L and 12R) in accordance with the number of taps of the adaptive filters 101 and 102, it can circumvent the mixing of the echoes from the microphone 14 even if the number of taps of the adaptive filters 101 and 102 is small and the echo cancellation processing capacity is low.

Embodiment 2

Figure 2:
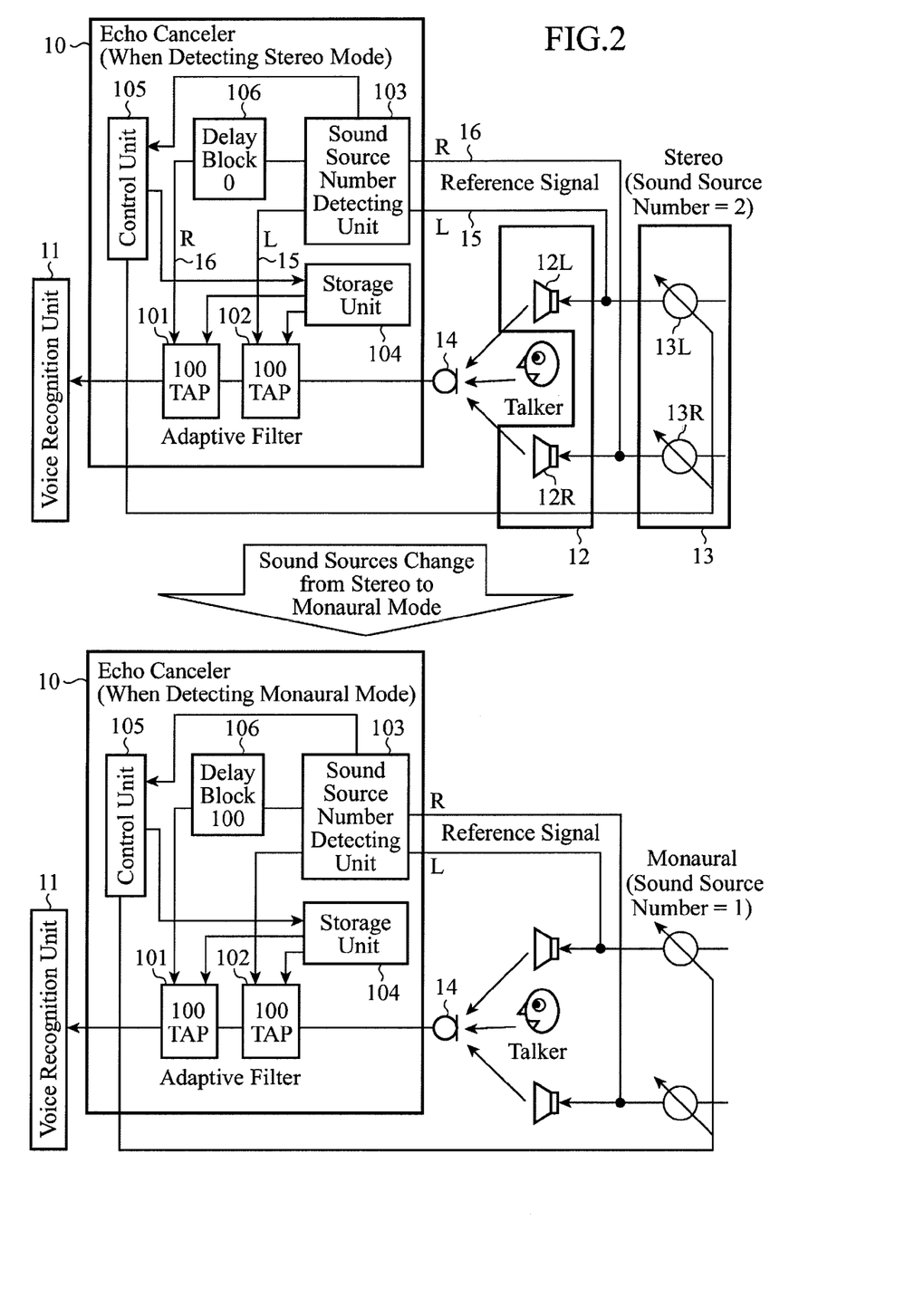
FIG. 2 is a block diagram showing a configuration of a voice recognition system including an echo canceler of an embodiment 2 in accordance with the present invention, and showing changes in the echo canceler when a sound source changes from a stereo to monaural mode.

FIG. 2 is a block diagram showing a configuration of a voice recognition system including an echo canceler of an embodiment 2 in accordance with the present invention, and showing changes in the echo canceler when a sound source changes from a stereo to monaural mode. In FIG. 2, blocks designated by the same reference numerals as those in FIG. 1 are assumed to have the same names and functions as the blocks shown in FIG. 1 unless otherwise specified.

As shown in FIG. 2, the echo canceler of the embodiment 2 in accordance with the present invention differs from the embodiment 1 shown in FIG. 1 in that it has a delay block 106 which delays samples corresponding to the number of taps of the adaptive filter 101, thereby making the number of taps of the adaptive filter 102 variable equivalently. Thus, the number of taps of the adaptive filter 102 is altered equivalently in accordance with the number of the sound sources here. The remaining configuration is the same as that of the embodiment 1.

In the foregoing configuration, the echo canceler 10 captures playback sounds by an onboard AV device, for example, which are output from the speakers 12L and 12R operating as echo sound sources, via the communication lines 15 and 16 as reference signals as in the embodiment 1. Then, the echo canceler 10 eliminates the output sounds of the speakers 12 (12L, 12R), which are mixed into the speech the talker produces via the microphone 14, with the adaptive filters 101 and 102, and delivers the output to the voice recognition unit 11.

Here, in addition to the configuration of the embodiment 1, the echo canceler 10 further includes the delay block 106. Accordingly, as long as the sound source number detecting unit 103 detects the stereo mode from the reference signals passing through the communication lines 15 and 16, the control unit 105 sets the delay by the delay block 106 at 0 sample, and controls the adaptive filters 101 and 102 to carry out the echo cancellation processing in the normal stereo mode.

On the other hand, when the sound source number detecting unit 103 detects the monaural mode, the control unit 105 causes the delay block 106 to delay by the number of samples corresponding to the number of taps (100) of the adaptive filter 101, and causes the two adaptive filters 101 and 102 to carry out the echo cancellation processing, thereby being able to increase the number of taps of the adaptive filters 101 and 102 equivalently, which improves the capacity of the echo cancellation.

Incidentally, in the embodiment 1 described before, it is necessary to redo learning for adaptive operation for performing tap switching of the adaptive filters 101 and 102. In the embodiment 2, however, the learning has already been completed as to the adaptive filter 102. Thus, it is enough to perform the learning processing only for the other adaptive filter 101. Accordingly, compared with the embodiment 1, the embodiment 2 has an advantage of being able to reduce the time required for the learning processing and the amount of operation for it.

In addition, it is assumed as in the embodiment 1 that the echo canceler 10 has the storage unit 104, that before altering the number of the delay samples of the delay block 106, the control unit 105 saves in the storage unit 104 the filter coefficients of the adaptive filters 101 and 102 which have been learned, and that when the sound source number detecting unit 103 detects the stereo mode next time, the control unit 105 restores the filter coefficients saved in the storage unit 104 previously and returns the number of the delay samples of the delay block 106 to the same value as that before alteration to use them. This makes it possible to reduce learning time period of the adaptive filters 101 and 102, and to contribute to reduction in the amount of operation required for learning.

Incidentally, when the adaptive filters 101 and 102 cannot sufficiently eliminate the playback sounds from the speakers 12 (12L, 12R), the control unit 105 can limit the volume of the speakers 12 (12L, 12R) at any desired level by controlling the volume control unit 13 (13L, 13R). This can prevent the AV playback sounds and the like output from the speakers 12 (12L, 12R) from mixing into the input speech.

Embodiment 3

Figure 3:
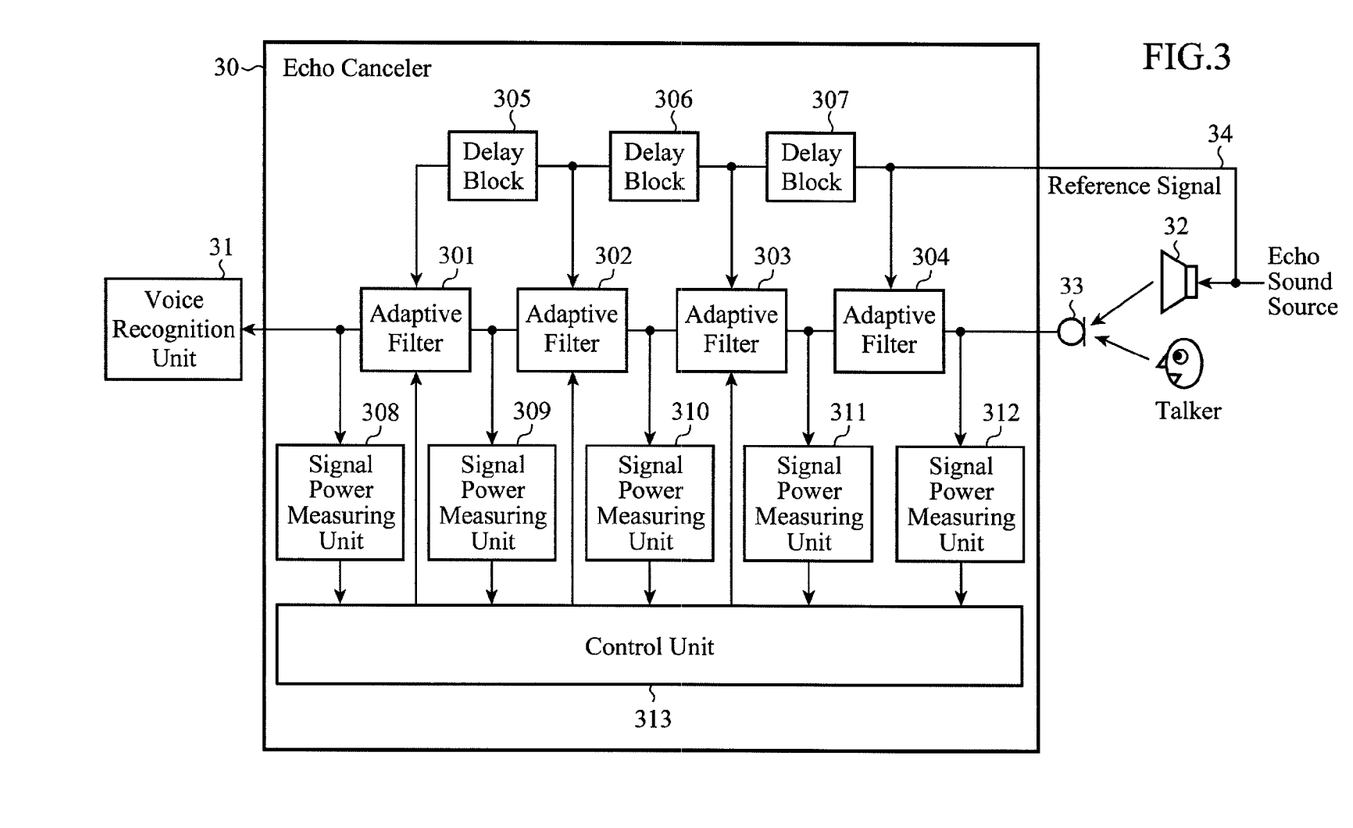
FIG. 3 is a block diagram showing a configuration of a voice recognition system including an echo canceler of an embodiment 3 in accordance with the present invention.

FIG. 3 is a block diagram showing a configuration of a voice recognition system including the echo canceler of an embodiment 3 in accordance with the present invention.

As shown in FIG. 3, the voice recognition system comprises an echo canceler 30, a voice recognition unit 31, a speaker 32 operating as an echo sound source, and a microphone 33. As will be described below, the echo canceler 30 optimizes the effective number of adaptive filters 301-304 to achieve the maximum echo cancellation effect with the minimum processor resources here.

The echo canceler 30, in which a processor (DSP) is mounted, has adaptive filters 301-304, delay blocks 305-307, signal power measuring units 308-312, and a control unit 313.

The signal power measuring units 308-312 monitor signal powers before and after each echo cancellation processing of the adaptive filters 301-304 based on the DSP, and delivers to the control unit 313. The control unit 313 monitors the signal powers before and after the echo cancellation processing of the adaptive filters 301-304 based on the DSP, and performs variable control of the effective number of the adaptive filters 301-304 according to the trade-off between the processing capacity of the DSP and the echo cancellation effect of the adaptive filters 301-304, which are decided from the outputs of the signal power measuring units 308-312.

In the foregoing configuration, the echo canceler 30 captures playback sounds by an onboard AV device, for example, which are output from the speaker 32, via the communication line 34 as a reference signal. Then, the echo canceler 30 eliminates the output sounds of the speaker 32, which are mixed into the speech the talker produces via the microphone 33, with the adaptive filters 301-304, and delivers the speech passing through the elimination to the voice recognition unit 31.

As shown in FIG. 3, the echo canceler 30 is configured in such a manner that it has a plurality of adaptive filters 301-304 connected in cascade, and that as for the signal powers before and after the echo cancellation processing which are the inputs and outputs of the individual adaptive filters 301-304, the signal power measuring units 308-312 measure them and deliver the results to the control unit 313.

While the voice recognition processing is not being performed (unless the talker is speaking), the control unit 313 compares the signal power immediately after the input to the microphone 33 with the signal powers passing through the individual adaptive filters 301-304, and compares changes of the signal powers before and after passing through the adaptive filters 301-304 with a threshold. If any one of the changes is less than the threshold, the control unit 313 stops the operation of the relevant adaptive filter (one of 301-304) to pass through the sounds, and releases the processor resources associated with it.

According to the foregoing echo canceler of the embodiment 3 in accordance with the present invention, it does not carry out echo cancellation processing as to the wasteful adaptive filter, thereby being able to perform the echo cancellation processing of eliminating the playback sounds from the speaker 32 from the input speech of the talker with the optimum effective number. Thus, according to the echo canceler of the embodiment 3, it can optimize the effective number of the adaptive filters 301-304 to achieve the maximum echo cancellation effect with the minimum processor resources.

Embodiment 4

Figure 4:
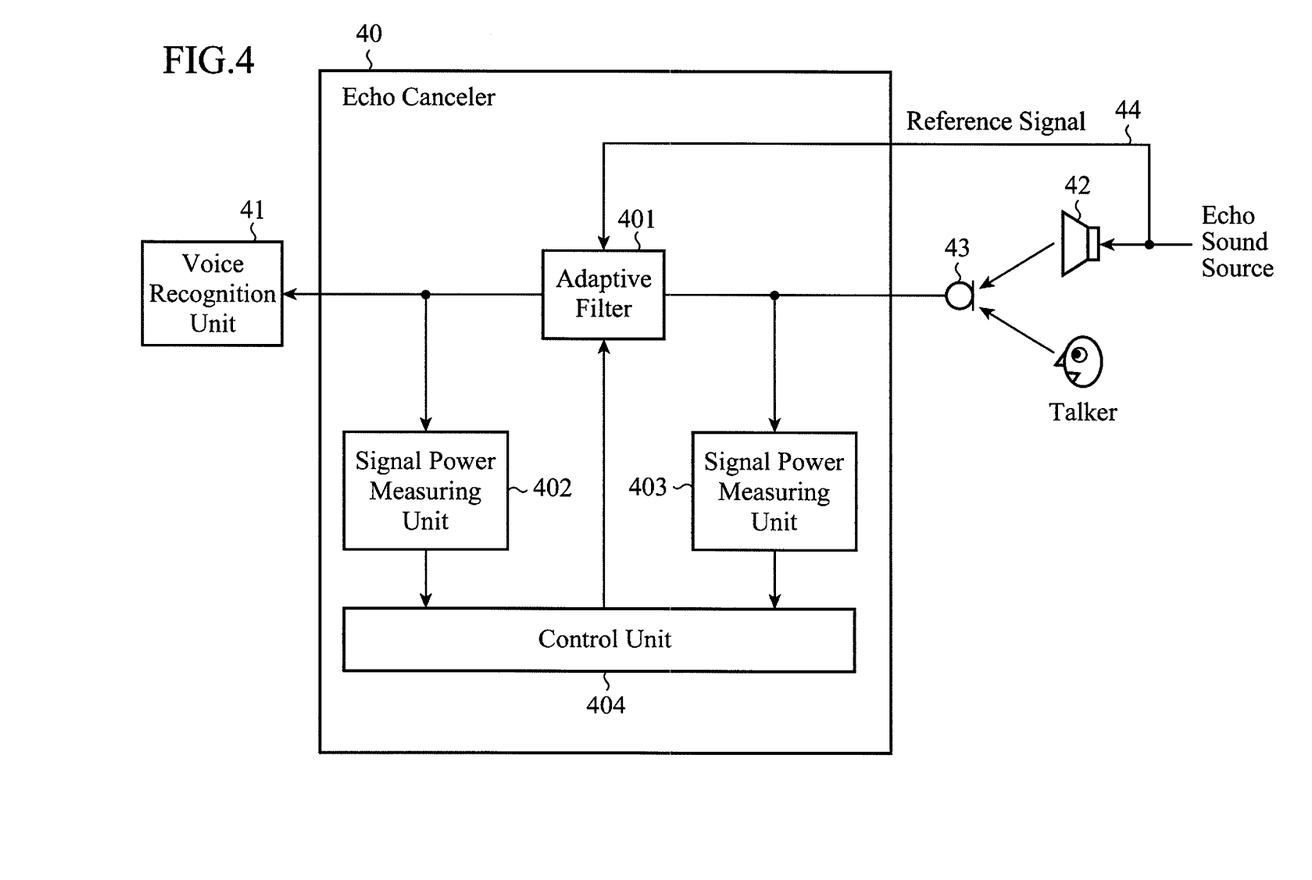
FIG. 4 is a block diagram showing a configuration of a voice recognition system including an echo canceler of an embodiment 4 in accordance with the present invention.

FIG. 4 is a block diagram showing a configuration of a voice recognition system including an echo canceler of an embodiment 4 in accordance with the present invention.

As shown in FIG. 4, the voice recognition system comprises an echo canceler 40, a voice recognition unit 41, a speaker 42 operating as an echo sound source, and a microphone 43. As will be described below, the echo canceler 40 here optimizes the number of taps to achieve the maximum echo cancellation effect with the minimum processor resources.

The echo canceler 40, in which a processor (DSP) is mounted, has an adaptive filter 401, signal power measuring units 402 and 403, and a control unit 404.

The signal power measuring units 402 and 403 monitor the signal powers before and after the echo cancellation processing of the adaptive filter 401 based on the DSP, and deliver to the control unit 404. The control unit 404 monitors the signal powers before and after the echo cancellation processing of the adaptive filter 401 based on the DSP, and performs variable control of the number of taps of the adaptive filter 401 according to the trade-off between the processing capacity of the DSP and the echo cancellation effect of the adaptive filter 401, which are decided from the outputs of the signal power measuring units 402 and 403.

Although the foregoing embodiment 3 is configured in such a manner that the control unit 313 stops the operation of the adaptive filter unnecessary for the echo cancellation processing (one of 301-304) to relinquish the processor resources and passes the sounds through it, the embodiment 4 which will be described below is configured in such a manner that the signal power measuring units 402 and 403 monitor the signal powers before and after the echo cancellation processing of the adaptive filter 401, and that the control unit 404 increases or decreases the number of taps successively so that the echo cancellation processing is performed at the number of taps that will reduce or increase the signal power after the echo cancellation processing by any given value with respect to the signal power before the echo cancellation processing.

More specifically, the echo canceler 40 captures playback sounds by an onboard AV device, for example, which are output from the speaker 42, via the communication line 44 as a reference signal. Then, the echo canceler 40 eliminates the output sounds of the speaker 42, which are mixed into the speech the talker produces via the microphone 43, with the adaptive filter 401 capable of varying the number of taps with the control unit 404, and delivers the speech passing through the elimination to the voice recognition unit 41.

In this case, as for the number of taps of the adaptive filter 401, the signal power measuring units 402 and 403 measure the signal powers before and after the echo cancellation processing by the adaptive filter 401, and the control unit 404 captures the measured values and compares the signal powers, thereby deciding the optimum number of taps.

When deciding the optimum number of taps, the control unit 404 successively increases the number of taps of the adaptive filter 401, and employs the number of taps at which the signal power the signal power measuring unit 402 measures becomes less than the power the signal power measuring unit 403 measures by any given value (threshold). Alternatively, under an environment in which the echoes are eliminated sufficiently, it successively reduces the number of taps of the adaptive filter 401, and employs the number of taps at which the signal power the signal power measuring unit 402 measures is raised by a threshold as compared with the signal power the signal power measuring unit 403 measures.

Incidentally, as for the timing for deciding the number of taps, in the same manner as the foregoing embodiments 1-3, it is set in the condition that the talker does not speak to the microphone 43 while the sound source causing the echo (speaker 42) outputs sounds, that is, while the voice recognition processing is not being performed. This makes it possible to circumvent erroneous recognition by the voice recognition unit 41 by preventing the adaptive filter 401 from changing the number of taps during the voice recognition by the voice recognition unit 41 and immediately before that.

According to the foregoing the echo canceler of the embodiment 4 in accordance with the present invention, it can carry out echo cancellation processing for eliminating the playback sounds from the speaker 42 from the input speech of the talker with the optimum number of taps without performing wasteful echo cancellation processing by the adaptive filter 401. Thus, according to the echo canceler of the embodiment 4 in accordance with the present invention, it can optimize the number of taps of the adaptive filter 401 so as to achieve the maximum echo cancellation effect with the minimum processor resources.

Incidentally, according to the outputs of the signal power measuring units 402 and 403, if the control unit 404 makes a decision that full echo cancellation effect cannot be achieved because the processing capacity of the DSP is not enough and hence the required number of taps of the adaptive filter 401 cannot be obtained, the maximum volume of the speaker 42 operating as the echo sound source can be limited. In addition, when limiting the volume of the speaker 42 operating as the echo sound source temporarily when the talker speaks, the control unit 404 is assumed to reduce the volume of only the echo sound source mounted close to the microphone 43 for catching the speech of the talker. Furthermore, depending on the place of the echo sound source, the control unit 404 is assumed to reduce to the limit value in accordance with the distance between the microphone 43 for catching the speech of the talker and the echo sound source, or in accordance with the speech propagation distance or speech propagation attenuation.

Moreover, as described above, when limiting the volume of the echo sound source (speaker 42) temporarily when the talker speaks, a report can be made that the echo sound source is limited and reduced with respect to the talker by showing on an LCD monitor (not shown) connected to the voice recognition unit as a peripheral device or by speech output via a speech synthesizer (not shown).

In addition, as in the embodiments 1-3, in the embodiment 4 described above, when changing the number of taps of the adaptive filter 401, the control unit 404 saves the filter coefficients of the adaptive filter 401 immediately before the change in the storage unit not shown, and reuses the filter coefficients by restoring them from the storage unit that saves them when performing processing by using the same number of taps next time.

Embodiment 5

Figure 5:
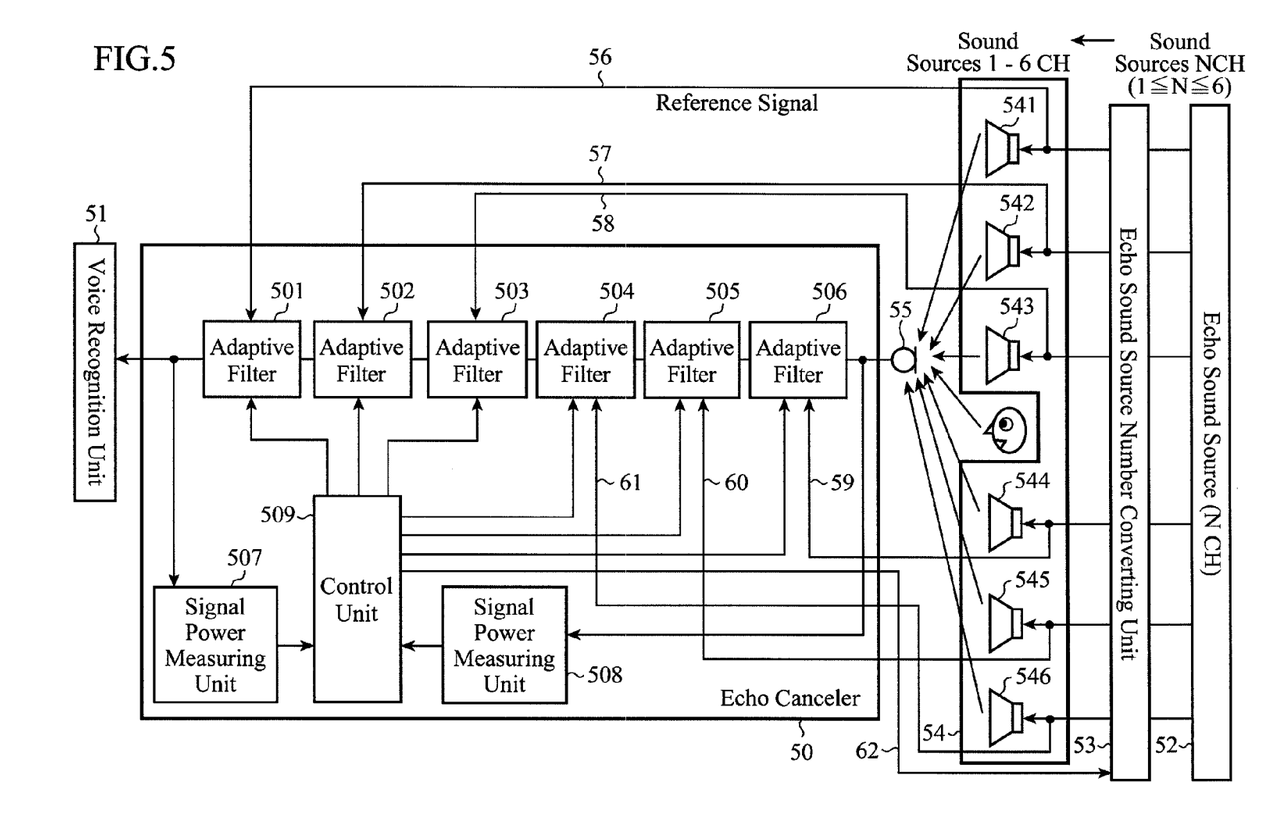
FIG. 5 is a block diagram showing a configuration of a voice recognition system including an echo canceler of an embodiment 5 in accordance with the present invention.

FIG. 5 is a block diagram showing a configuration of a voice recognition system including the echo canceler of an embodiment 5 in accordance with the present invention.

As shown in FIG. 5, the voice recognition system comprises an echo canceler 50, a voice recognition unit 51, an N-channel echo sound source 52, an echo sound source number converting unit 53, speakers 54 (541-546), and a microphone 55. The echo canceler 50 can automatically change the number of channels of the echo sound source 52 in accordance with the number of taps of the adaptive filters 501-506 required as will be described below.

Incidentally, the echo sound source number converting unit 53 has a function of reducing the number of channels of the echo sound source 52 according to a prescribed condition as will be described later, and is assumed here to carry out downmixing/surround conversion.

The term "downmixing" refers to processing of converting, when surround software cannot be played back in the original format, its playback originally intended by its producer to the number of channels less than the original such as converting to a stereo mode.

The echo canceler 50 has six adaptive filters 501-506 with their number of taps made variable for eliminating sounds of the 6-channel echo sound source 52, for example, which are mixed to the speech of the talker collected with the microphone 55.

The echo canceler 50 further includes signal power measuring units 507 and 508 for measuring signal powers before and after the echo cancellation processing by the adaptive filters 501-506 connected in cascade; and a control unit 509 that monitors, as will be described later, the signal powers before and after the echo cancellation processing of the adaptive filters 501-506, and that when making a decision that the DSP cannot process by its own processing capacity the adaptive filters 501-506 by the number of the echo sound sources, controls the echo sound source number converting unit 53 to cause the echo sound source 52 to reduce its effective number of channels thereof.

In the foregoing configuration, the echo canceler 50 captures playback sounds by an onboard AV device, for example, which are output from the speaker 54, into the individual adaptive filters 501-506 via the communication lines 56-61 as reference signals. Then, the echo canceler 50 eliminates the output sounds of the speakers 54 (541-546), which are mixed into the speech the talker produces via the microphone 55, with the control unit 509 using the adaptive filters 501-506, and delivers the speech passing through the elimination to the voice recognition unit 51.

In the echo canceler 50, when making a decision that the amount of echo cancellation is not enough from the outputs of the signal power measuring units 507 and 508 and from the comparison of the threshold with the difference between values before and after passing through the adaptive filters 501-506, which are measured by the signal power measuring units 507 and 508, the control unit 509 controls the echo sound source number converting unit 53 via a communication line 62 to carry out processing of reducing the number of channels of the echo sound source 52 by the downmixing processing. At the same time, the control unit 509 stops the operation of the adaptive filter (one of 501-506 or more) corresponding to a reduced channel, and assigns the surplus processing capacity of the DSP resulting from the stop to an increase in the number of taps of the remaining adaptive filters (one or more of 501-506).

In contrast with the above, when making a decision that the amount of echo cancellation is excessive from the outputs of the signal power measuring units 507 and 508 and from the comparison of the threshold with the difference between the values which are measured by the signal power measuring units 507 and 508, the control unit 509 controls the echo sound source number converting unit 53 via the communication line 62, thereby carrying out control of not reducing the number of channels of the echo sound source 52, or controls, when the number of channels of the echo sound source 52 is less than six, the echo sound source number converting unit 53, thereby causing it to increase the number of channels up to six by the surround processing and to output to the speakers 54 (541-546). In this case, the control unit 509 carries out the echo cancellation processing by operating all the six adaptive filters 501-506 connected in cascade.

The foregoing processing can achieve sufficient echo cancellation effect even in an environment requiring a number of taps of the adaptive filters 501-506 such as when the volume of the speakers 54 (541-546) is large. At the same time, it can provide an echo canceler capable of achieving echo cancellation by a multichannel sound source in an environment requiring only a few number of taps of the adaptive filters 501-506. Thus, according to the echo canceler of the embodiment 5, it can automatically vary the number of channels of the echo sound source 52 in accordance with the number of taps of the adaptive filters 501-506 required.

According to the foregoing echo canceler of the embodiment 5 in accordance with the present invention, when the DSP processing capacity that can be used temporarily is not enough and cannot handle the echo cancellation processing by the adaptive filters 501-506 prepared by the number of channels of the echo sound source 52, it can reduce the number of channels by the downmixing processing of the echo sound source 52, thereby enabling echo cancellation processing corresponding to the processing capacity of the DSP.

In addition, by increasing the number of taps of the adaptive filters 501-506 by the amount corresponding to the reduction of the channels of the echo sound source 52 by the downmixing, it can achieve sufficient echo cancellation effect by reducing the number of channels of the echo sound source 52 and by increasing the number of taps of the adaptive filters 501-506 even under conditions in which the echo cancellation effect is not fully achieved because of temporary lack of the number of taps of the adaptive filters 501-506.

Furthermore, when the amount of echo cancellation is enough and the DSP has a surplus processing capacity, it can increase a sense of realism of music and the like serving as the echo sound source 52 by utilizing the surplus DSP processing capacity by increasing the number of adaptive filters 501-506 that carry out the processing by stopping the downmixing of the echo sound source 52 or by increasing the number of the sound sources by performing the stereo/surround conversion processing. In addition, by increasing the number of taps of the adaptive filters 501-506 by decreasing the number of channels of the echo sound source 52 by the downmixing processing in accordance with an increase of the set volume of the echo sound source 52, it can raise, when applied to the voice recognition, the upper limit of the volume of the sound source causing echoes in which the voice recognition is possible.

Incidentally, as for the functions of the blocks of the echo canceler 10 (30, 40 or 50) of the foregoing embodiment 1-embodiment 5 in accordance with the present invention, they can be implemented by hardware only, or at least part of them can be implemented by software.

For example, as for the control unit 105 (embodiment 1 or 2) that makes the number of taps of the adaptive filters 101 and 102 variable in accordance with the number of the sound sources detected by the sound source number detecting unit 103, as for the control unit 313 or 404 (embodiment 3 or 4) that makes the effective number of the adaptive filters 301-304 or the number of taps of the adaptive filter 401 variable in accordance with the trade-off between the processing capacity of the processor and the echo cancellation effect by one or more adaptive filters (301-304 or 401), which are decided from the outputs of the signal power measuring units 308-312 or of the signal power measuring units 402 and 403, and as for the data processing of the control unit 509 (embodiment 5) that carries out processing of reducing the effective number of channels of the echo sound source 52 by controlling the echo sound source number converting unit 53 when a decision is made that the processing capacity of the processor is not enough for processing the adaptive filters 501-506 corresponding to the number of channels of the sound source causing echoes by monitoring the signal powers before and after the echo cancellation processing of the adaptive filters 501-506, they can be implemented by hardware, or part of them can be implemented by one or more programs on a computer.

INDUSTRIAL APPLICABILITY

As described above, in order to achieve greater echo cancellation effect independently of the number of the echo sound sources, an echo canceler in accordance with the present invention is an echo canceler for generating an echo elimination signal by filtering, through adaptive filters, reference signals input from sound sources causing echoes, and is configured in such a manner as to comprise a sound source number detecting unit for detecting the number of the sound sources causing echoes from the reference signals, and a control unit for making the number of taps of the adaptive filters variable in accordance with the number of the sound sources detected by the sound source number detecting unit. Accordingly, in the voice recognition of an onboard navigation system or in a hands-free phone, it is suitable to be used as an echo canceler capable of performing voice recognition of, or transferring to the party of a phone, only speech of a talker by eliminating music or sounds output from an onboard speaker from the speech input to a microphone.

What is claimed is:

1. An echo canceler having a processor for generating an echo elimination signal by filtering, through one or more adaptive filters, reference signals input from sound sources causing echoes, the echo canceler comprising:
a sound source number conversion unit for making the number of the echo sound sources variable in accordance with a prescribed condition; and
a control unit for monitoring signal powers before and after echo cancellation processing of the adaptive filters, and for reducing an effective number of the echo sound sources by controlling the sound source number conversion unit when making a decision that processing capacity of the processor is not enough to process the adaptive filters the number of which equals the number of the sound sources causing echoes.

2. The echo canceler according to claim 1, wherein
the control unit increases the number of taps of the adaptive filters by the number the sound source number conversion unit reduces the number of the echo sound sources.

3. The echo canceler according to claim 1, wherein
the control unit, when making a decision that the processor has surplus processing capacity by monitoring the signal powers before and after the echo cancellation processing of the adaptive filters, controls the sound source number conversion unit to stop processing of reducing the sound sources causing echoes or to increase the effective number of the adaptive filters by increasing the number of the sound sources causing echoes.

4. The echo canceler according to claim 1, wherein
the control unit monitors set volume of the echo sound sources, and controls the sound source number conversion unit to further reduce the effective number of the echo sound sources and to further increase the number of taps of the adaptive filters as the set volume increases.

* * * * *